US012558648B2

(12) United States Patent
Nakano et al.

(10) Patent No.: US 12,558,648 B2
(45) Date of Patent: Feb. 24, 2026

(54) AMINE COMPOUND, ACID GAS ABSORBENT, METHOD FOR REMOVING ACID GAS, AND ACID GAS REMOVAL APPARATUS

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Yoshihiko Nakano, Yokohama (JP); Akiko Suzuki, Ota (JP); Reiko Yoshimura, Kawasaki (JP); Asato Kondo, Yokohama (JP); Shinji Murai, Sagamihara (JP); Yusuke Handa, Kita (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/693,895

(22) Filed: Mar. 14, 2022

(65) Prior Publication Data

US 2023/0104687 A1 Apr. 6, 2023

(30) Foreign Application Priority Data

Sep. 15, 2021 (JP) ................................ 2021-150538

(51) Int. Cl.
*B01D 53/14* (2006.01)
*B01D 53/40* (2006.01)
*C01B 32/50* (2017.01)

(52) U.S. Cl.
CPC ..... *B01D 53/1475* (2013.01); *B01D 53/1425* (2013.01); *B01D 53/1493* (2013.01);
(Continued)

(58) Field of Classification Search
None
See application file for complete search history.

(56) References Cited

U.S. PATENT DOCUMENTS 4,770,791 A 9/1988 Crump et al.
7,374,734 B2 5/2008 Grossman et al.
(Continued)

FOREIGN PATENT DOCUMENTS

CN 102596362 A 7/2012
CN 113501796 A * 10/2021 ........... C07D 295/13
(Continued)

OTHER PUBLICATIONS

Material Safety Data Sheet for 2-(piperazin-1-yl)ethan-1-ol. Enamine Ltd., published Mar. 10, 2021. Downloaded on Feb. 13, 2024 from https://www.enaminestore.com/catalog/EN300-20181.*
(Continued)

*Primary Examiner* — Daniel Berns
(74) *Attorney, Agent, or Firm* — Oblon, McClelland, Maier & Neustadt, L.L.P.

(57) ABSTRACT

Embodiments provide an amine compound having a large amount of an acid gas to be absorbed and strong oxidation resistance, an absorbent containing the amine compound, a method for removing an acid gas, and an acid gas removal apparatus.

9 Claims, 1 Drawing Sheet

(52) U.S. Cl.
CPC .......... *C01B 32/50* (2017.08); *B01D 2252/10* (2013.01); *B01D 2252/20436* (2013.01); *B01D 2257/504* (2013.01)

(56) References Cited

U.S. PATENT DOCUMENTS

| | | | |
|---|---|---|---|
| 9,044,478 B2 | 6/2015 | Sergeant et al. | |
| 10,625,200 B2 | 4/2020 | Suzuki et al. | |
| 11,123,683 B2 | 9/2021 | Suzuki et al. | |
| 2009/0149464 A1 | 6/2009 | Sergeant et al. | |
| 2012/0128561 A1 | 5/2012 | Blair et al. | |
| 2012/0282160 A1 | 11/2012 | Just et al. | |
| 2013/0053409 A1* | 2/2013 | Butterworth | C07D 487/10 544/331 |
| 2019/0160422 A1 | 5/2019 | Murai et al. | |

FOREIGN PATENT DOCUMENTS

| | | | | |
|---|---|---|---|---|
| EP | 3 219 379 A1 | | 9/2017 | |
| JP | 2006-518662 A | | 8/2006 | |
| JP | 2006-240966 A | | 9/2006 | |
| JP | 2012-533414 A | | 12/2012 | |
| JP | 2019-055371 A | | 4/2019 | |
| JP | 2019-055394 A | | 4/2019 | |
| JP | 2020-44489 A | | 3/2020 | |
| JP | 2022-119073 A | | 8/2022 | |
| NL | 8503265 A | * | 6/1986 | B01D 53/1425 |
| WO | WO-2006137335 A1 | * | 12/2006 | C07D 295/13 |
| WO | WO-2014001669 A1 | * | 1/2014 | B01D 53/1468 |
| WO | WO-2020169477 A1 | * | 8/2020 | B01D 53/1425 |
| WO | WO-2022013307 A1 | * | 1/2022 | |

OTHER PUBLICATIONS

Loba Chemie, "Isopropylamine for synthesis MSDS." Published Sep. 4, 2015; viewed on Jan. 7, 2025 at https://www.lobachemie.com/lab-chemical-msds/MSDS-isoPROPYLAMINE-CASNO-75-31-04222-EN.aspx.*

Voice et al., "Oxidative degradation of amines with high-temperature cycling", Energy Procedia, 37, 2013, pp. 2118-2132.

Office Action issued on Nov. 22, 2024, in Japanese Patent Application No. 2021-150538 (with English machine translation).

Japanese Notice of Allowance issued May 20, 2025 in Japanese Patent Application No. 2021-150538 (with unedited computer-generated English Translation), 3 pages.

Combined Chinese Office Action and Search Report issued Jul. 31, 2025 in Chinese Patent Application No. 202211031933.8 (with unedited computer-generated English Translation of Office Action only), 24 pages.

* cited by examiner

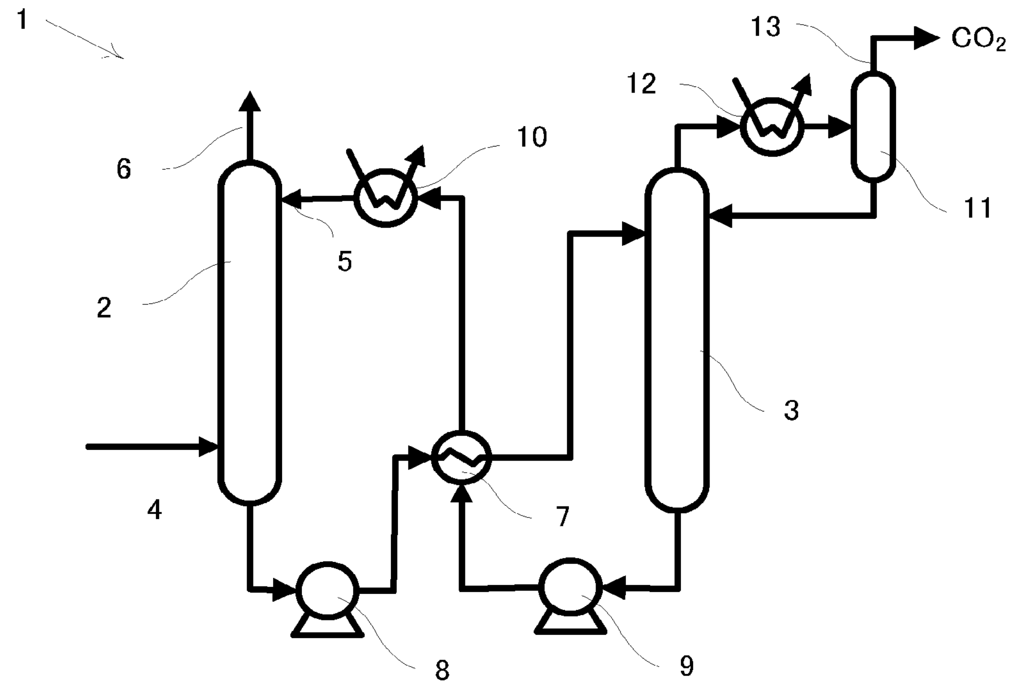
1
13
CO2
12
10
6
5
2
11
3
4
7
8
9

AMINE COMPOUND, ACID GAS ABSORBENT, METHOD FOR REMOVING ACID GAS, AND ACID GAS REMOVAL APPARATUS

CROSS REFERENCE TO RELATED APPLICATIONS

This application is based upon and claims the benefit of priority from the prior Japanese Patent Application No. 2021-150538, filed on Sep. 15, 2021, the entire contents of which are incorporated herein by reference.

FIELD

Embodiments of the present invention relate to a novel amine compound, an acid gas absorbent, a method for removing an acid gas, and an acid gas removal apparatus.

BACKGROUND

In recent years, a greenhouse effect caused by an increase in carbon dioxide ($CO_2$) concentration has been pointed out as one factor for global warming phenomena, and international measures for protecting the environment on a global scale are urgently needed. $CO_2$ is generated mainly by industrial activities, and there is a growing momentum to suppress emission of $CO_2$ to the environment.

As a technique for suppressing an increase in concentration of an acid gas such as $CO_2$, there are indicated development of an energy saving product, use of an acid gas as a resource, a technique of isolating and storing an acid gas, and conversion to alternative energy, such as natural energy or nuclear energy, which does not discharge an acid gas. As one of these techniques, a technique of separating and recovering a discharged acid gas is known.

Acid gas separation techniques that have been studied so far include absorption methods, adsorption methods, membrane separation methods, and deep cooling methods. Among them, the absorption method is suitable and economical for efficiently treating a large amount of gas, and it is easy to increase a size of a removal apparatus. Therefore, application of the absorption method to factories and power plants has been studied.

As a method intended for a thermal power plant or the like using fossil fuel, mainly, a method of removing and recovering $CO_2$ in a combustion exhaust gas by bringing exhaust gas generated when burning fossil fuel (coal, oil, natural gas, etc.) into contact with a chemical absorbent, and, further, a method for storing recovered $CO_2$ are known. In addition, it has been proposed to remove an acid gas such as hydrogen sulfide ($H_2S$) in addition to $CO_2$ using a chemical absorbent.

In general, alkanolamines typified by monoethanolamine (MEA) are known as chemical absorbents used in the absorption method. Such alkanolamines have been developed since the 1930s and are still used today. Common alkanolamines used in the absorption method include 2-amino-2-methylpropanolamine, methylaminoethanol, ethylaminoethanol, propylaminoethanol, diethanolamine, methyldiethanolamine, dimethylethanolamine, diethylethanolamine, triethanolamine, and dimethylamino-1-methylethanol.

When these conventionally used alkanolamines are used alone, a $CO_2$ absorption rate may not be sufficient, and, usually, a compound having a reaction promoting effect is often used in combination. As such a compound having a reaction promoting effect, a cyclic diamine is known, but which generally has a high vapor pressure, is easily dissipated, and may have poor handleability in some cases. In addition, for recovery of carbon dioxide, a step of absorbing carbon dioxide into an aqueous amine solution and a step of desorbing carbon dioxide from an aqueous solution that has absorbed carbon dioxide are performed with high efficiency. Also, recovery energy consumed for recovery of carbon dioxide during the steps is required to be low. In order to meet this requirement, an absorbent having a large amount of carbon dioxide to be absorbed is effectively used. At the same time, it is required, from the viewpoint of influences on the environment to suppress diffusion of an amine to be released to the atmosphere as much as possible. For example, JP 2006-518662 T discloses an absorbent for removing an acid gas from a fluid. The absorbent contains a combination of a tertiary alkanolamine and hydroxyethyl piperazine or the like.

On the other hand, in the $CO_2$ recovery system described above, the exhaust gas (acid gas) contains oxygen, and, for the $CO_2$ release (recovery) from the absorbent that has absorbed the acid gas, the absorbent is often heated at 100° C. or higher. Under such an environment, it is known that the amine in the absorbent is oxidized by oxygen, and deteriorates as the heating temperature increases.

For example, oxidation of the alkanolamine in the acid gas absorption step and an increase in deterioration due to an increase in heating temperature have been reported.

As described above, conventional absorbents have low durability (oxidation resistance), and thus have a problem that absorption characteristics deteriorate with time. Therefore, a new absorbent that simultaneously satisfies durability and an amount of an acid gas to be absorbed is required, as an acid gas absorbent.

BRIEF DESCRIPTION OF THE DRAWINGS

FIG. 1 is a schematic diagram of an acid gas removal apparatus according to an embodiment.

DETAILED DESCRIPTION

The acid gas absorbent according to an embodiment contains: a solvent; and at least one or more amine compounds selected from the group consisting of amine compounds represented by Formula (1a) and Formula (1b).

(1a)

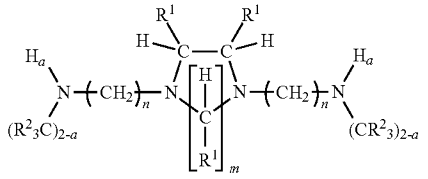

(1b)

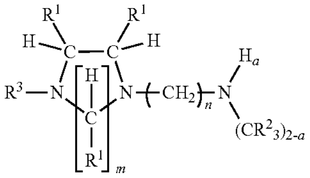

wherein:

$R^1$'s are each independently hydrogen or an unsubstituted or substituted alkyl group having 3 or less carbon atoms, $R^2$'s are each independently hydrogen or an unsubstituted or substituted alkyl group having 3 or less carbon atoms, and at least two of $R^2$'s contained in one-$CR^2_3$ are not hydrogen, $R^3$ is an unsubstituted or substituted alkyl group having 4 or less carbon atoms, a's are each independently 0 or 1, m is a number of 1 to 3; and n's are each independently a number of 1 to 4.

A method for removing an acid gas according to an embodiment includes bringing a gas containing an acid gas into contact with the acid gas absorbent to remove the acid gas from the gas containing the acid gas.

An acid gas removal apparatus according to an embodiment includes:

an absorber that removes an acid gas from a gas containing the acid gas by causing the acid gas absorbent to absorb the acid gas by contact between the gas containing the acid gas and the acid gas absorbent; and a regenerator that desorbs the acid gas from the acid gas absorbent that has absorbed the acid gas to regenerate the acid gas absorbent, in which the acid gas absorbent that has been regenerated by the regenerator is reused by the absorber.

Furthermore, an amine compound according to an embodiment is represented by formula (1a).

(1a)

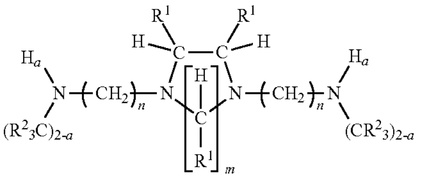

wherein:

$R^1$'s are each independently hydrogen or an unsubstituted or substituted alkyl group having 3 or less carbon atoms, $R^2$'s are each independently hydrogen or an unsubstituted or substituted alkyl group having 3 or less carbon atoms, and at least two of $R^2$'s contained in one-$CR^2_3$ are not hydrogen, a's are each independently 0 or 1, m is a number of 1 to 3; and n's are each independently a number of 1 to 4.

Embodiments will now be explained with reference to the accompanying drawings.

Hereinafter, embodiments of the present invention will be described in detail. In the following embodiments, a case where the acid gas is carbon dioxide will be described as an example. However, the acid gas absorbent according to an embodiment of the present invention can provide the same effect also on other acid gases such as hydrogen sulfide. The acid gas absorbent according to the embodiment is particularly suitable for absorption of oxidized gases such as carbon dioxide and hydrogen sulfide.

The acid gas absorbent according to the embodiment contains a solvent and a specific amine compound. One cyclic diamine compound that can be used as this specific amine compound is represented by Formula (1a):

(1a)

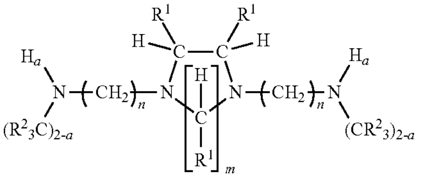

wherein:

$R^1$'s are each independently hydrogen or an unsubstituted or substituted alkyl group having 3 or less carbon atoms, $R^2$'s are each independently hydrogen or an unsubstituted or substituted alkyl group having 3 or less carbon atoms, and at least two of $R^2$'s contained in one-$CR^2_3$ are not hydrogen, a's are each independently 0 or 1, m is a number of 1 to 3; and n's are each independently a number of 1 to 4.

More specifically, $R^1$ is hydrogen, a methyl group, an ethyl group, a propyl group, or an isopropyl group, and $R^2$ is hydrogen, a methyl group, or an ethyl group. Also, n is 1 to 4, preferably 2 to 3, and m is 1 to 3, preferably 2.

Such an amine compound represented by Formula (1a) has not been conventionally known. Specific examples of the amine compound will be indicated below.

(1a-1)

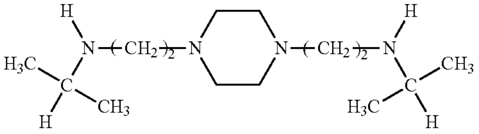

(1a-2)

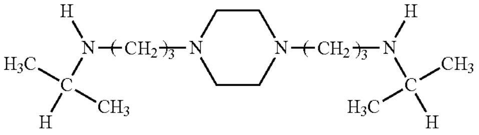

(1a-3)

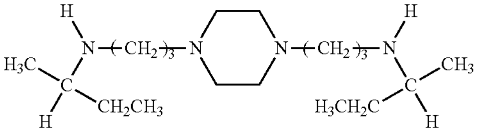

(1a-4)

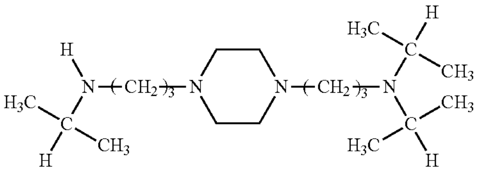

(1a-6)

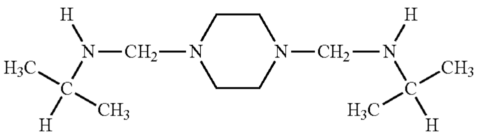

(1a-6)

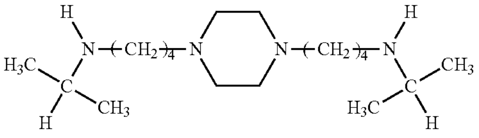

-continued (1a-7)

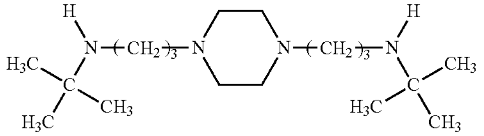

(1a-8)

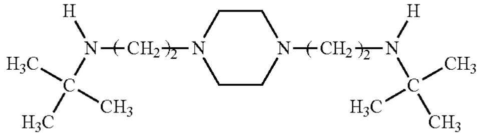

(1a-9)

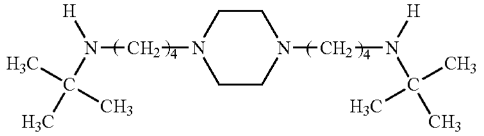

(1a-10)

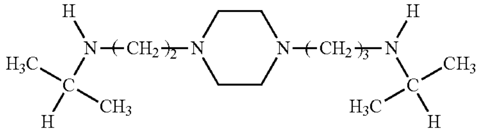

(1a-11)

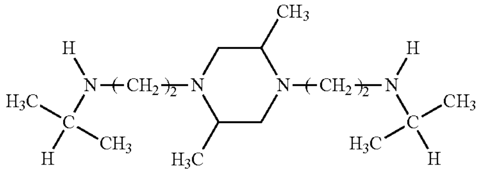

(1a-12)

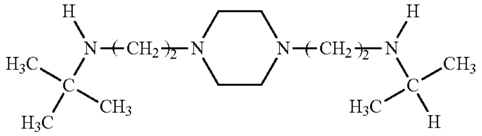

Another cyclic diamine compound that can be used in the acid gas absorbent according to the embodiment is represented by Formula (1b):

(1b)

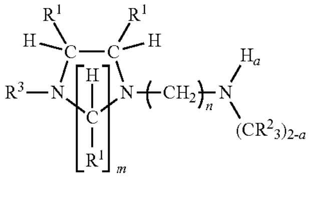

wherein:

$R^1$'s are each independently hydrogen or an unsubstituted or substituted alkyl group having 3 or less carbon atoms, $R^2$'s are each independently hydrogen or an unsubstituted or substituted alkyl group having 3 or less carbon atoms, and at least two of $R^2$'s contained in one-$CR^2_3$ are not hydrogen, $R^3$ is an unsubstituted or substituted alkyl group having 4 or less carbon atoms, a's are each independently 0 or 1, m is a number of 1 to 3; and n's are each independently a number of 1 to 4.

More specifically, $R^1$ is hydrogen, a methyl group, an ethyl group, an n-propyl group, or an isopropyl group; $R^2$ is hydrogen, a methyl group, or an ethyl group; and $R^3$ is hydrogen, a methyl group, an ethyl group, an n-propyl group, an isopropyl group, an n-butyl group, a sec-butyl group, or a tert-butyl group. Also, n is 1 to 4, preferably 2 to 3, and m is 1 to 3, preferably 2.

Specific examples of such an amine compound represented by Formula (1b) will be indicated below.

(1b-1)

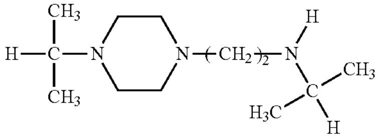

(1b-2)

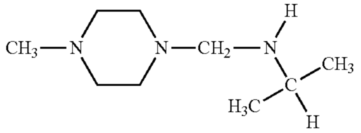

(1b-3)

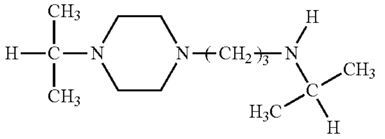

(1b-4)

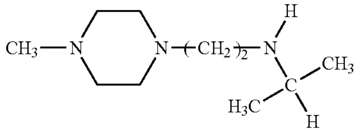

(1b-5)

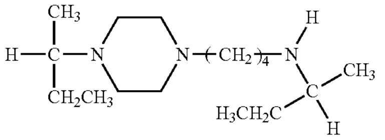

(1b-6)

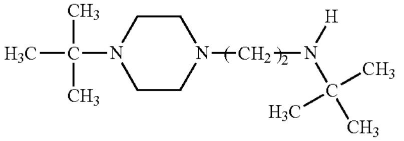

(1b-7)

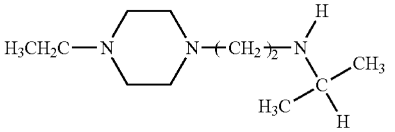

(1b-8)

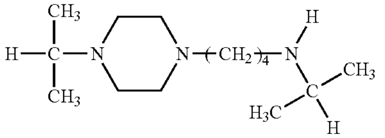

(1b-9)

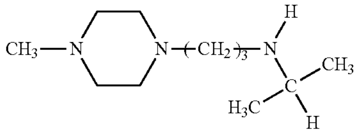

-continued (1b-10)

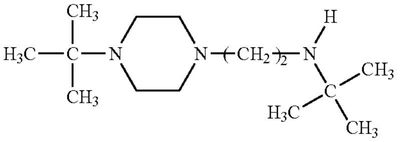

(1b-11)

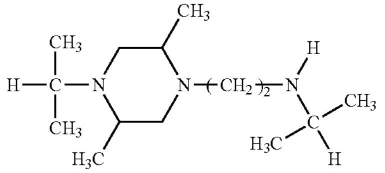

(1b-12)

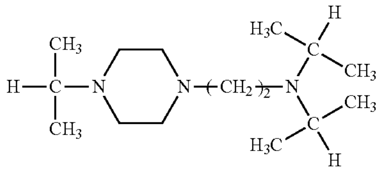

The acid gas absorbent according to the embodiment contains either Formula (1a) or (1b). Here, two or more of the compounds represented by Formula (1a) may be combined, two or more of the compounds represented by Formula (1b) may be combined, and further, the compounds represented by Formula (1a) and Formula (1b) may be combined. A method for producing the compound of Formula (1a) or (1b) will be described later, but, in a production process thereof, a mixture of a compound in which a in the formula is 1 and a compound in which a in the formula is 0 may be used. In such cases, the mixture can also be used as it is, without being separated, in the acid gas absorbent according to the embodiment.

A total content rate of the cyclic diamine compounds represented by Formula (1a) or Formula (1b) contained in the acid gas absorbent according to the embodiment is preferably 10 to 60 mass %, and more preferably 20 to 50 mass %, based on the total mass of the acid gas absorbent. In general, the higher the content rate of the amine compound is, the larger amounts of carbon dioxide to be absorbed and to be desorbed per unit volume are, and the higher carbon dioxide absorption rate and desorption rate are, which is thus preferable in terms of energy consumption and treatment efficiency. In general, when the content rate of the amine compound in the acid gas absorbent is too high, a viscosity of the absorbent is likely to increase. However, in the embodiment, when the content rate of the amine compound of Formula (1a) or Formula (1b) is 60 mass % or less, such a tendency is not observed. The content rate of the amine compound represented by Formula (1a) or (1b) is set to 10 mass % or more, leading to attainment of a sufficient amount of carbon dioxide to be absorbed, a sufficient carbon dioxide absorption rate, and excellent treatment efficiency. When the acid gas absorbent in which the content rate of the amine compound represented by Formula (1a) or (1b) is in the above range is used for carbon dioxide recovery, the acid gas absorbent is advantageous in long-term operation because of not only its large amount of carbon dioxide to be absorbed but also its high oxidation durability.

The acid gas absorbent according to the embodiment can contain an additional amine compound represented by the following Formula (2) in addition to the cyclic diamine compound:

(2)

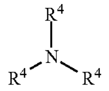

wherein $R^4$'s are each independently hydrogen or an unsubstituted or substituted alkyl group, at least one of three $R^4$'s is not hydrogen, and the $R^4$'s may have a cyclic structure in which two $R^4$'s are linked to each other.

Specific examples of $R^4$ include hydrogen, a methyl group, an ethyl group, an isopropyl group, a tert-butyl group, a sec-butyl group, a hydroxyethyl group, a hydroxypropyl group, a hydroxypentyl group, a hydroxyhexyl group, a hydroxyheptyl group, a hydroxyoctyl group, an aminopropyl group, an aminopentyl group, an aminohexyl group, an aminoheptyl group, and an aminocityl group. In addition, two $R^4$'s can be linked to each other to form a piperazine ring, a pyrrolidine ring, a morpholine ring, a piperidine ring, or the like.

Specific examples of the amine compound represented by Formula (2) include:

1-(2-hydroxyethyl)piperazine,
1-(2-aminoethyl)piperazine,
1,4-bis[3-aminopropyl]piperazine,
N-isopropyldiethanolamine,
N-isopropyldipropanolamine,
N-isopropyldibutanolamine,
N-isopropyldipentanolamine,
N-isopropyldihexanolamine,
3-[(2-hydroxyethyl)(propan-2-yl)amino]propan-1-ol,
4-[(2-hydroxyethyl)(propan-2-yl)amino]butan-1-ol, 5-[(2-hydroxyethyl)(propan-2-yl)amino]pentan-1-ol,
6-[(2-hydroxyethyl)(propan-2-yl)amino]hexan-1-ol,
N-sec-butyldiethanolamine,
N-sec-butyldipropanolamine,
N-sec-butyldibutanolamine,
N-sec-butyldipentanolamine,
N-sec-butyldihexanolamine,
3-[(2-hydroxyethyl)(butan-2-yl)amino]propan-1-ol, 4-[(2-hydroxyethyl)(butan-2-yl)amino]butan-1-ol,
5-[(2-hydroxyethyl)(butan-2-yl)amino]pentan-1-ol, 6-[(2-hydroxyethyl)(butan-2-yl)amino]hexan-1-ol, N-cyclopentyldiethanolamine,
N-cyclopentyldipropanolamine,
N-cyclopentyldibutanolamine,
N-cyclopentyldipentanolamine,
N-cyclopentyldihexanolamine,
3-[(2-hydroxyethyl)(cyclopentyl)amino]propan-1-ol,
4-[(2-hydroxyethyl)(cyclopentyl)amino]butan-1-ol,
5-[(2-hydroxyethyl)(cyclopentyl)amino]pentan-1-ol,
6-[(2-hydroxyethyl)(cyclopentyl)amino]hexan-1-ol,
2-azetidine methanol,
2-(2-aminoethyl)azetidine,
2-pyrrolidinemethanol,
2-(2-aminoethyl)pyrrolidine,
2-piperidinemethanol,
3-piperidineethanol,
2-(2-aminoethyl)pyrrolidine,
1-(2-hydroxyethyl)piperazine,
2-(hydroxymethyl)piperazine, 3-hydroxypyrrolidine,
3-pyrrolidinemethanol,
2-(2-hydroxyethyl)pyrrolidine,
4-piperidineethanol,
3-hydroxypiperidine, 4-hydroxypiperidine, 4-(hydroxymethyl)piperidine, and
3-aminopiperidine. The additional amine compound is not limited to these compounds.

Among them,
1-(2-hydroxyethyl)piperazine,
1-(2-aminoethyl)piperazine,
1,4-bis[3-aminopropyl]piperazine,
N-isopropyldiethanolamine,
N-isopropyldipropanolamine,
3-[(2-hydroxyethyl)(propan-2-yl)amino]propan-1-ol,
N-sec-butyldiethanolamine,
N-sec-butyldipropanolamine,
N-sec-butyldibutanolamine,
3-[(2-hydroxyethyl)(butane-2-yl)amino]propan-1-ol, N-cyclopentyldiethanolamine,
N-cyclopentyldipropanolamine, and
3-[(2-hydroxyethyl)(cyclopentyl)amino]propan-1-ol,
are preferred.

A total amine content rate of the cyclic diamine compound represented by Formula (1a) or (1b) and the additional amine compound represented by Formula (2) contained in the acid gas absorbent is preferably 10 to 60 mass %, and more preferably 20 to 50 mass %. A content rate of the compound represented by Formula (2) based on the total mass of the acid gas absorbent is preferably 1 to 40 mass % and more preferably 5 to 30 mass %. When the content rate of the compound represented by Formula (2) contained in the acid gas absorbent is less than 1 mass %, an effect of improving the acid gas absorption rate may not be sufficiently obtained. If the content rate exceeds 30 mass %, the oxidation durability of the absorbent may be greatly reduced.

The acid gas absorbent according to the embodiment contains a solvent, and the amine compound is dissolved or dispersed therein. As the solvent, water, an organic solvent, or a mixed solvent thereof, for example, an aqueous solvent can be used. From the viewpoint of safety and cost, it is preferable to use water or an aqueous solvent as the solvent. However, in order to improve solubility of the amine compound and the like, an organic solvent or a mixed solvent having a relatively high organic solvent content can also be used. The aqueous solvent mainly contains water and contains a small amount of an organic solvent. However, when a boiling point of the organic solvent is low, the organic solvent may volatilize in an acid gas absorbing device to cause damage to the device. Therefore, the organic solvent has a boiling point of water, that is, 100° C. or higher. When water is used as the solvent, a content rate thereof is preferably 40 to 90 mass %, and particularly preferably 50 to 80 mass %, based on the total mass of the acid gas absorbent. The content rate of water within this range is preferable from the viewpoint of suppressing an increase in viscosity of the absorbent and suppressing foaming when absorbing carbon dioxide. In addition, the aqueous solvent contains a small amount of organic solvent, but a content rate thereof is preferably 1 mass % or less based on the acid gas absorbent.

In addition, optional components include, for example, an antioxidant, a pH adjusting agent, an antifoaming agent, and an anticorrosive.

Preferable specific examples of the antioxidant include dibutylhydroxytoluene (BHT), butylhydroxyanisole (BHA), sodium erythorbate, sodium nitrite, sulfur dioxide, 2-mercaptoimidazole, and 2-mercaptobenzimidazole. When the antioxidant is used, the content rate thereof based on the total mass of the acid gas absorbent is preferably 0.01 to 1 mass %, and particularly preferably 0.1 to 0.5 mass %.

The antioxidant can prevent deterioration in acid gas absorbent and improve life thereof. Preferable specific examples of the antifoaming agent can include a silicone-based antifoaming agent and an organic antifoaming agent. When the antifoaming agent is used, a content rate thereof based on the total mass of the acid gas absorbent is preferably 0.00001 to 0.001 mass %, and particularly preferably 0.0005 to 0.001 mass %. The antifoaming agent can prevent foaming of the acid gas absorbent, suppress, for example, a decrease in absorption efficiency and desorption efficiency of the acid gas, and prevent a decrease in fluidity or circulation efficiency of the acid gas absorbent.

Preferable specific examples of the anticorrosive include phosphoric acid esters, tolyltriazoles, and benzotriazoles. When the anticorrosive is used, the content rate thereof based on the total mass of the acid gas absorbent is preferably 0.00003 to 0.0008 mass %, and particularly preferably 0.00005 to 0.005 mass %. Such an anticorrosive can prevent corrosion of plant equipment and improve life thereof.

Preferably, the acid gas absorbent according to the embodiment does not contain a low-boiling-point material, specifically, a compound having a boiling point of lower than 100° C. The reason for this is as follows: the acid gas absorbent is heated in a process of removing the acid gas or recovering the acid gas, and thus the low-boiling-point material evaporates and is released into the atmosphere, or the concentration thereof decreases, so that the acid gas removal efficiency changes. Specifically, the content rate of the material having a boiling point of lower than 100° C. is preferably 1 mass % or less, and more preferably 0.1 mass % or less, based on the total mass of the acid gas absorbent.

As described above, according to the acid gas absorbent of the present embodiment, the amount of the acid gas such as carbon dioxide to be absorbed can be increased, and diffusibility of a reaction accelerator can be reduced. An amount of energy required to recover the acid gas is small. Furthermore, since the amine compound used has a plurality of hydroxy groups as polar groups in the molecule, and the diffusibility is suppressed, the diffusion to the outside of a reactor is suppressed. Due to this, the acid gas can be stably treated for a long period of time, even when a reaction accelerator having a low vapor pressure is used in combination. Further, it has high reactivity with the acid gas (for example, carbon dioxide ($CO_2$), hydrogen sulfide ($H_2S$), or carbonyl sulfide (COS)), and is excellent in solubility in water, and thus hardly precipitates at the time of absorbing the acid gas. The acid gas absorbent of the embodiment of the present invention is further improved in amount of the acid gas (in particular, carbon dioxide) to be absorbed per unit mole, and amount of the acid gas to be absorbed and acid gas absorption rate per unit volume of the acid gas absorbent are further improved. In addition, an amount of the amine released from an absorption tower or a regeneration tower can be reduced.

Method for Removing Acid Gas

The method for removing an acid gas according to the embodiment of the present invention includes bringing a gas containing an acid gas into contact with a first acid gas absorbent or a second acid gas absorbent, as described above, to remove the acid gas from the gas containing the acid gas.

The method for removing an acid gas according to the embodiment of the present invention has a basic configuration including: a step of absorbing an acid gas into the acid gas absorbent according to the embodiment of the present invention (absorption step); and a step of desorbing the acid gas from the acid gas absorbent according to the embodiment of the present invention which has absorbed the acid gas. That is, the basic configuration of the method for removing an acid gas according to the embodiment of the present invention includes: a step of bringing a gas containing an acid gas (for example, an exhaust gas or the like) into contact with the acid gas absorbent to cause the acid gas absorbent to absorb the acid gas (acid gas absorption step); and a step of heating the acid gas absorbent which has absorbed the acid gas, obtained in the acid gas absorption step, to desorb and remove the acid gas (acid gas separation step).

A method for bringing the gas containing the acid gas into contact with an aqueous solution containing the acid gas absorbent is not particularly limited, and can be performed, for example, by a method in which the gas containing the acid gas is bubbled into the acid gas absorbent to cause the absorbent to absorb the acid gas, a method in which the acid gas absorbent is dropped in a mist form into a gas flow containing the acid gas (atomizing or spraying method), a method in which the gas containing the acid gas and the acid gas absorbent are brought into countercurrent contact with each other in an absorber containing a filler made of porcelain or metal mesh, or the like.

A temperature of the acid gas absorbent when the gas containing the acid gas is absorbed into the aqueous solution is usually preferably from room temperature to 60° C. or lower. The temperature is more preferably 50° C. or lower, and particularly preferably 20 to 45° C. The lower the temperature is, the more the amount of the acid gas to be absorbed increases, but a lower limit value of the treatment temperature can be determined by a gas temperature in the process, a heat recovery target, and the like.

A pressure during absorption of the acid gas is usually almost atmospheric pressure. Although it is also possible to increase the pressure to a higher level in order to enhance the absorption performance, it is preferable to absorb the acid gas under atmospheric pressure in order to suppress the energy consumption required for compression.

Examples of a method for separating the acid gas from the acid gas absorbent that has absorbed the acid gas and recovering pure or high-concentration carbon dioxide include a method of heating the acid gas absorbent in the same manner as distillation, foaming the acid gas absorbent in a pot, and desorbing the acid gas, and a method of heating the acid gas absorbent while expanding a liquid interface in a shelf tower, a spray tower, or a regeneration tower containing a filler made of porcelain or metal mesh. As a result, the acid gas is liberated and released from carbamate anions and bicarbonate ions.

A temperature of the acid gas absorbent during separation of the acid gas is usually 70° C. or higher, preferably 80° C. or higher, and more preferably 90 to 120° C. Although the amount of the acid gas to be desorbed increases as the temperature increases, the energy required for heating the absorbent increases when the temperature increases, and thus the temperature can be determined according to the gas temperature in the process, the heat recovery target, and the like.

A pressure during separation of the acid gas can be usually about 1 to 3 atm. Although it is also possible to reduce the pressure to a lower level in order to enhance the separation performance, it is preferable to separate the acid gas under a pressure within this range in order to suppress the energy consumption required for pressure reduction. The acid gas absorbent after separation of the acid gas can be sent to the acid gas absorption step again for cyclic use (recycle). In addition, heat generated during absorption of the acid gas is generally cooled by heat exchange in a heat exchanger for preheating the aqueous solution to be injected into the regenerator in a process of recycling the aqueous solution.

The purity of the thus recovered acid gas is usually as high as about 95 to 99 vol %. The pure acid gas or the high-concentration acid gas can be used as a synthetic raw material for a chemical product or a polymer substance, a cooling agent for freezing foods, or the like. In addition, it is also possible to isolate and store the recovered acid gas in the underground or the like that is now under technical development.

Among the steps described above, the step of separating the acid gas from the acid gas absorbent and regenerating the acid gas absorbent consumes the largest amount of energy, and, in this step, about 50 to 80% of the energy required for all the steps may be consumed. Therefore, by reducing the energy to be consumed in the acid gas absorbent regeneration step, a cost of the process for absorption and separation of the acid gas can be reduced, and the acid gas can be economically advantageously and efficiently removed from the exhaust gas. According to the present embodiment, energy required for acid gas separation (regeneration step) can be reduced by using the acid gas absorbent of the embodiment described above. Therefore, the process for absorption and separation of carbon dioxide can be efficiently performed under economically advantageous conditions.

In addition, the amine compound according to the embodiment described above has a remarkably high corrosion protection property with respect to metal materials such as carbon steel, as compared with alkanolamines such as 2-aminoethanol which have been conventionally used as an acid gas absorbent. Therefore, the acid gas removal method using such an acid gas absorbent, when adopted, does not require use of high-cost high-grade corrosion resistant steel in plant construction or the like, which is advantageous in terms of cost.

Acid Gas Removal Apparatus

The acid gas removal apparatus according to the embodiment of the present invention includes: an absorber that removes an acid gas from a gas containing the acid gas by causing the first acid gas absorbent or the second acid gas absorbent to absorb the acid gas by contact between the gas containing the acid gas and the acid gas absorbent; and a regenerator that desorbs the acid gas from the acid gas absorbent that has absorbed the acid gas to regenerate the acid gas absorbent, in which the acid gas absorbent that has been regenerated by the regenerator is reused by the absorber. FIG. 1 is a schematic diagram of an acid gas removal apparatus according to an embodiment.

An acid gas removal apparatus 1 includes: an absorber 2 that brings a gas containing an acid gas (for example, exhaust gas) into contact with an acid gas absorbent and absorbs and removes the acid gas from the gas containing the acid gas; and a regenerator 3 that separates the acid gas from the acid gas absorbent that has absorbed the acid gas and regenerates the acid gas absorbent. Hereinafter, a case where the acid gas is carbon dioxide will be described as an example.

FIG. 1 is a schematic diagram of an acid gas removal apparatus according to an embodiment.

The acid gas removal apparatus 1 includes: the absorber 2 that brings a gas containing an acid gas (for example, exhaust gas) into contact with an acid gas absorbent and absorbs and removes the acid gas from the gas containing the acid gas; and the regenerator 3 that separates the acid gas from the acid gas absorbent that has absorbed the acid gas and regenerates the acid gas absorbent. Hereinafter, a case where the acid gas is carbon dioxide will be described as an example.

As illustrated in FIG. 1, an exhaust gas containing carbon dioxide such as a combustion exhaust gas discharged from a thermal power plant or the like is guided to a lower portion of the absorber 2 through a gas supply port 4. This exhaust gas is pushed into the absorber 2 and comes into contact with the acid gas absorbent supplied from an acid gas absorbent supply port 5 in an upper portion of the absorber 2. As the acid gas absorbent, the acid gas absorbent according to the embodiment described above is used.

In addition to the amine-based compound and the solvent such as water, the acid gas absorbent may contain other compounds such as a nitrogen-containing compound that improves a carbon dioxide absorption performance, an antioxidant, and a pH adjuster in an arbitrary ratio.

Thus, when the exhaust gas comes into contact with the acid gas absorbent, carbon dioxide in the exhaust gas is absorbed and removed by the acid gas absorbent. The exhaust gas from which carbon dioxide has been removed is discharged from the gas discharge port 6 to the outside of the absorber 2.

The acid gas absorbent that has absorbed carbon dioxide is fed to a heat exchanger 7 by a rich liquid pump 8, and further fed to the regenerator 3. The acid gas absorbent fed into the regenerator 3 moves from an upper portion to a lower portion of the regenerator 3, and, during this time, the acid gas in the acid gas absorbent is desorbed, and the acid gas absorbent is regenerated.

The acid gas absorbent regenerated by the regenerator 3 is fed to the heat exchanger 7 and an absorbent cooler 10 by a lean liquid pump 9, and returned from the acid gas absorbent supply port 5 to the absorber 2.

On the other hand, the acid gas separated from the acid gas absorbent comes into contact with reflux water supplied from a reflux drum 11 in the upper portion of the regenerator 3, and is discharged to the outside of the regenerator 3.

The reflux water in which carbon dioxide is dissolved is cooled by a reflux condenser 12, and then separated from a liquid component in which water vapor accompanied with carbon dioxide is condensed, in the reflux drum 11. This liquid component is guided to the acid gas recovery step by a recovery acid gas line 13. On the other hand, the reflux water from which the acid gas has been separated is fed to the regenerator 3.

According to the acid gas removal apparatus 1 of the present embodiment, it is possible to efficiently absorb and remove the acid gas by using the acid gas absorbent having excellent acid gas absorption characteristics and acid gas desorption characteristics.

The reflux water from which the acid gas has been separated is fed to the regenerator 3 by a reflux water pump (not shown). According to the acid gas removal apparatus 1 of the present embodiment, it is possible to efficiently absorb and remove the acid gas by using the acid gas absorbent having excellent acid gas absorption characteristics and acid gas desorption characteristics.

Hereinafter, embodiments of the present invention will be described in more detail using examples.

[Synthesis Example] Synthesis of 1,4-bis(2-isopropylaminoethyl)piperazine (1a-1)

(i) Synthesis of 1-chloro-2-(N-isopropyl)amino) ethane (M1)

Sodium hydroxide (36.4 g (0.91 mol)) was weighed in a beaker and dissolved in water to make 300 ml of a solution, and 0.6 mol of 1-chloro-2-(N-isopropyl)amino)ethane hydrochloride (2·HCl) synthesized by the above method was added thereto, and dissolved by stirring the solution well, followed by extraction with ether three times. The ether phase was dried over anhydrous sodium sulfate and then concentrated to a state where ether remained slightly to obtain 1-chloro-2-(N-isopropyl)amino)ethane (M1). (However, when all the ethers are removed, compound 2 gradually causes an autolysis reaction.)

The synthesized compound was subjected to measurement using a 400 MHz NMR apparatus manufactured by JEOL Ltd. (model JMTCO-400/54/SS, JELO model NM-SCM40SS/AL) and identified.

NMR spectrum of M1

$^1$H-NMR, ($CDCl_3$, ppm) δ: 1.08 (d, 6H, J=6.4 Hz), 2.84 (m, 1H), 2.95 (t, 2H, J=5.7 Hz), 3.66 (t, 2H, J=5.7 Hz), $^{13}$C-NMR ($CDCl_3$, ppm) δ: 22.95, 45.12, 48.02, 48.45

(ii) Synthesis of 1,4-bis(2-isopropylaminoethyl)piperazine (1a-1)

Next, 51.71 g (0.60 mol) of piperazine, 72.88 g (0.72 mol) of triethylamine, and 200 ml of acetonitrile were added to a four-necked flask equipped with a reflux condenser tube, a mechanical stirrer, a thermometer, and a dropping funnel, and the mixture was heated to 70° C. To the mixture, a product obtained by adding 100 ml of acetonitrile, from the dropping funnel, to an ether solution of 0.6 mol of 1-chloro-2-(N-isopropyl)amino)ethane (M1) synthesized by the above method, removing ether, and performing the solvent exchange was added. After dropwise addition, the mixture was reacted at 70° C. for 13 hours, and then cooled to room temperature. The precipitate was removed, by filtration, from the reaction mixture, and the filtrate was concentrated. Then, the concentrate was redissolved in ether and the precipitate was further filtered. The filtrate was dried over anhydrous sodium sulfate and then concentrated to obtain 37.49 g of a reaction mixture (orange liquid). This reaction product was purified by a column chromatograph (activated alumina, developing solvent:chloroform:hexane=85:15 in volume ratio) to obtain 15.62 g of a yellow clear liquid of a target compound (19.8% based on raw material 2) (1a-1) and 9.75 g (9.5%) of a yellow clear liquid of 1-(2-isopropylaminoethyl)piperazine (M2).

NMR spectrum of 1a-1

$^1$H-NMR, ($CDCl_3$, ppm) δ: 1.06 (d, 12H, J=5.9 Hz), 2.49 (t, 4H, J=6.4 Hz), 2.4 to 2.7 (m, 8H), 2.69 (t, 4H, J=6.4 Hz), 2.76 (m, 2H)

$^{13}$C-NMR ($CDCl_3$, ppm) δ: 23.03, 44.13, 48.90, 53.30, 58.04

NMR spectrum of M2

$^1$H-NMR, ($CDCl_3$, ppm) δ: 1.07 (d, 6H, J=6.4 Hz), 2.48 (t, 2H, J=6.4 Hz), 2.3 to 2.6 (m, 4H), 2.70 (t, 2H, J=6.4 Hz), 2.78 (m, 1H), 2.89 (t, J=6.4 Hz, 4H), $^{13}$C-NMR ($CDCl_3$, ppm) δ: 23.07, 44.97, 46.20, 48.92, 54.69, 58.72

Synthesis of 1,4-bis[3-(N-isopropylamino)propyl] piperazine (1a-2)

Under an argon atmosphere, 100.33 g (0.500 mol) of 1,4-bis(3-aminopropyl)piperazine, 165.9 g (1.20 mol) of potassium carbonate, and 200 ml of anhydrous acetonitrile were added to a four-necked flask equipped with a reflux condenser tube equipped with an argon introduction tube, a mechanical stirrer, a thermometer, and a dropping funnel. The mixture was heated to about 70° C. To the mixture, a solution obtained by dissolving 147.7 g (1.18 mol) of 2-bromopropane in 50 ml of anhydrous acetonitrile was added dropwise from the dropping funnel. After dropwise addition, the mixture was reacted at 70° C. for 8 hours, and a solution obtained by dissolving 36.94 g (0.30 mol) of 2-bromopropane in 50 ml of anhydrous acetonitrile was further added dropwise. After dropwise addition, the mixture was reacted at 70° C. for 12 hours, and then cooled to room temperature. The precipitate was removed, by filtration, from the reaction mixture, and the filtrate was concentrated. Then, the concentrate was redissolved in ether and the precipitate was further filtered. The filtrate was dried over anhydrous sodium sulfate and then concentrated to obtain 120.7 g (yield 84.7%) of a pale yellow transparent liquid of 1,4-bis[3-(N-isopropylamino)propyl]piperazine (1a-2).

NMR spectrum of 1a-2

$^1$H-NMR, ($CDCl_3$, ppm) δ: 1.05 (d, 6H, J=6.4 Hz), 1.67 (m, 4H), 2.39 (t, 2H, J=7.3 Hz), 2.3 to 2.6 (m, 8H), 2.63 (t, 2H, J=7.1 Hz), 2.78 (m, H)

$^{13}$C-NMR ($CDCl_3$, ppm) δ: 22.88, 27.27, 46.31, 48.63, 55.22, 57.08

Synthesis of 1,4-bis[3-(N-sec-butylamino)propyl] piperazine (1a-3)

Under an argon atmosphere, 100.33 g (0.500 mol) of 1,4-bis(3-aminopropyl)piperazine, 165.8 g (1.20 mol) of potassium carbonate, and 200 ml of anhydrous acetonitrile were added to a four-necked flask equipped with a reflux condenser tube having an argon introduction tube, a mechanical stirrer, a thermometer, and a dropping funnel. The mixture was heated to about 70° C. To the mixture, a solution obtained by dissolving 164.54 g (1.18 mol) of 2-bromobutane in 50 ml of anhydrous acetonitrile was added dropwise from the dropping funnel. After dropwise addition, the mixture was reacted at 70° C. for 24 hours, and then cooled to room temperature. The precipitate was removed, by filtration, from the reaction mixture, the precipitate was washed with chloroform, and the filtrate was then concentrated. The concentrate was redissolved in hexane, the precipitate was removed by filtration. The filtrate was dried over anhydrous sodium sulfate, and then the filtrate was concentrated. The reaction product was separated by a column chromatograph (silica, developing solvent: hexane) and concentrated to obtain 95.2 g of a pale yellow clear liquid of 1,4-bis [3-(N-sec-butylamino)propyl]piperazine (1a-3). The compound was identified by NMR.

NMR spectrum of 1a-3

$^1$H-NMR, ($CDCl_3$, ppm) δ: 0.88 (t, 6H, J=7.3 Hz), 1.02 (d, 6H, 6.9 Hz), 1.30 (m, 2H), 1.47 (m, 2H), 1.67 (m, 4H), 2.2 to 2.9 (m, 14H), 2.39 (t, 4H, J=7.3 Hz), $^{13}$C-NMR ($CDCl_3$, ppm) δ: 10.34, 19.83, 27.36, 29.53, 46.21, 53.33, 54.74, 57.21

Synthesis of 1-[3-(N-isopropylamino)propyl]-4-[3-(N-diisopropylamino)propyl]piperazine (1a-4)

Under an argon atmosphere, 10.1 g (0.0355 mol) of compound 1a-2, 11.77 g (0.0852 mol) of potassium carbonate, and 20.2 g (0.164 mmol) of 2-bromopropane were added to a four-necked flask equipped with a reflux condenser tube having an argon introduction tube, a mechanical stirrer, a thermometer, and a dropping funnel, 10 ml of anhydrous acetonitrile was added thereto, and the mixture was reacted at a reflux temperature for 16 hours, and cooled to room temperature. The precipitate was removed, by filtration, from the reaction mixture, and the filtrate was concentrated. Then, the concentrate was redissolved in hexane and the precipitate was further filtered. The reaction product was separated by a column chromatograph (silica, developing solvent: hexane) and concentrated to obtain 5.21 g (yield 45%) of a pale yellow clear liquid of 1-[3-(N-isopropylamino)propyl]-4-[3-(N-diisopropylamino)propyl]-piperazine (1a-4). The compound was identified by NMR.

NMR spectrum of 1a-4

$^1$H-NMR, ($CDCl_3$, ppm) δ: 0.99 (d, 12H, J=6.4 Hz), 1.05 (d, 6H, J=6.4 Hz), 1.58 (m, 4H) 1.67 (m, 2H), 2.32 (t, 2H, J=7.3 Hz), 2.39 (t, 1H, J=7.3 Hz), 2.3 to 2.7 (m, 8H), 2.63 (t, 2H, J=7.1 Hz), 2.78 (m, 1H), 3.0 (m, 2H)

$^{13}$C-NMR ($CDCl_3$, ppm) δ: 20.67, 22.96, 27.34, 28.46, 43.15, 46.37, 48.32, 48.87, 53.35, 56.70, 57.15

Synthesis of 1-isopropyl-4-[2-(N-isopropylamino) ethyl]piperazine (1b-1)

In a four-necked flask equipped with a reflux condenser tube having an argon introduction tube, a thermometer, a dropping funnel, and a mechanical stirrer, 38.76 g (0.300 mol) of 1-(2-aminoethyl)piperazine was added, and 150 ml of anhydrous acetonitrile is added thereto for dissolution. Added thereto was 99.59 g (0.720 mol) of potassium carbonate ($K_2CO_3$). Under an argon atmosphere, 49.29 g (0.401 mol) of 2-bromopropane dissolved in 40 ml of anhydrous acetonitrile at room temperature was gradually added with a dropping funnel. After completion of dropwise addition, the mixture was heated in an oil bath and reacted at 65° C. for 4 hours, but the reaction hardly proceeded. After the reaction solution was cooled to room temperature, the precipitate was filtered out, and washed with chloroform, and the washing liquid was combined with the previous filtrate, and the solvent was concentrated with an evaporator. Diethyl ether was added to the residue for dissolution, followed by filtration. The filtrate was dried over anhydrous sodium sulfate, and then the solvent was concentrated with an evaporator to obtain 51.17 g of a light yellow transparent liquid as a product. Further, the liquid was purified by distillation under reduced pressure to obtain a product (15.6 g) using a distillation component (distillation temperature: 85 to 89° C. (220 Pa)).

$^1$H-NMR (CDCl3, ppm) δ: 1.06 (d, J=6.7 Hz, 6H), 1.09 (d, J=6.2 Hz, 6H), 2.4 to 2.8 (m, 14H)

13C-NMR ($CDCl_3$, ppm) δ 18.62, 22.84, 44.07, 48.67, 48.82, 53.34, 54.34, 58.03

Examples 1 to 10, and Comparative Examples 1 to 6

Each of the amines (1a-1 to 1a-4) synthesized as shown in the synthesis examples, 1-isopropyl-4-[2-(N-isopropylaminoluethyl]piperazine (1b-1), 2-(N-methylamino)ethanol (MEA), methyldiethanolamine (MDEA), 2-methyl-2 amino-1 propanol (AMP), 1-(2-hydroxyethyl)piperazine (HEPZ), and 1-(2-aminoethyl)piperazine (AEPZ) were used and dissolved in water at a concentration as shown in Table 1 to prepare an acid gas absorbent. In addition, a mixture of 1a-2 and 1-(2-hydroxylethyl)piperazine (HEPZ), 1-(2-aminoethyl)piperazine (HEPZ), and 1,4-bis(3-aminopropyl)piperazine (bisAPPZ) was used and dissolved in water so as to attain 30 to 50 mass %, thereby obtaining an aqueous solution (hereinafter, referred to as an absorbent).

Evaluation of Amount of Carbon Dioxide to be Absorbed

Each of these acid gas absorbents was filled in a test tube and heated to 40° C., and a mixed gas containing 10 vol % of carbon dioxide ($CO_2$) and 90 vol % of a nitrogen ($N_2$) gas was passed through the acid gas absorbent at a flow rate of 400 mL/min. The concentration of carbon dioxide ($CO_2$) in the gas at the outlet of the test tube was measured using an infrared gas concentration measuring apparatus (trade name "CGT-700" manufactured by Shimadzu Corporation) to evaluate the absorption performance. The obtained results are as indicated in Table 1.

Accelerated Degradation Test (Oxidation Resistance Test)

A degradation test on an acid gas absorbent was performed at a higher temperature than the temperature of 120° C. usually assumed in a regeneration tower. In a pressure-resistant sealed container having a volume of 50 ml, 20 ml of each of the acid gas absorbents which had absorbed $CO_2$ in the above examples and oxygen gas were sealed, and the container was allowed to stand for one week under sealing conditions: at 140° C. and in an oxygen atmosphere, and a residual state of amine was examined. The absorbent before and after the degradation test was analyzed using GC/MS, and an amine disappearance weight (k/kg) per kg of the absorbent was calculated, as a disappearance amount, from a decrease in integral value obtained from a chromatogram. The obtained results are as indicated in Table 1.

As described above, some embodiments have been described, but these embodiments have been presented as examples, and are not intended to limit the scope of the invention. These novel embodiments can be implemented in various other forms, and various combinations, omissions, substitutions, changes, and the like can be made without departing from the gist of the invention. These embodiments and variations thereof are included in the scope and gist of the invention, and are included in the invention according to the claims and the equivalent thereof.

DESCRIPTION OF REFERENCE NUMERALS

1 Acid gas removal apparatus
2 Absorber
3 Regenerator
4 Gas supply port
5 Acid gas absorbent supply port
6 Gas discharge port
7 Heat exchanger
8 Rich liquid pump
9 Lean liquid pump
10 Absorbent cooler
11 Reflux drum
12 Reflux condenser
13 Recovery acid gas carbon line While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

TABLE 1

| | | amine compound | concentration (mass %) | amine compound | concentration (mass %) | amount of $CO_2$ absorption (NL/kg) | disappearance amount of amine compound (g/kg) |
|---|---|---|---|---|---|---|---|
| Example | 1 | 1a-1 | 50 | — | — | 30 | 0 |
| | 2 | 1a-2 | 50 | — | — | 39 | 0 |
| | 3 | 1a-3 | 50 | — | — | 32 | 0 |
| | 4 | 1a-2 | 45 | 1a-4 | 5 | 39 | 0 |
| | 5 | 1a-2 | 20 | HEPZ | 30 | 47 | 0 |
| | 6 | 1a-2 | 16 | HEPZ | 24 | 39 | 0 |
| | 7 | 1a-2 | 12 | HEPZ | 18 | 32 | 0 |
| | 8 | 1a-2 | 30 | AEPZ | 10 | 50 | 3 |
| | 9 | 1a-2 | 30 | bisAPPZ | 10 | 40 | 4 |
| | 10 | 1b-1 | 50 | — | — | 27 | 0 |
| Comparative Example | 1 | MEA | 30 | — | — | 61 | 48 |
| | 2 | MDEA | 45 | — | — | 8 | 49 |
| | 3 | AMP | 30 | — | — | 43 | 87 |
| | 4 | HEPZ | 50 | — | — | 50 | 25 |
| | 5 | AEPZ | 50 | — | — | 80 | 30 |
| | 6 | bisAPPZ | 50 | — | — | 65 | 40 |

Results

As is apparent from the above results, as compared with conventional acid gas absorbents, the acid gas absorbent according to the embodiment exhibited the same amount of carbon dioxide absorbed, and obviously exhibited a very low amine disappearance weight. Thus, it was clear that the acid gas absorbent according to the embodiment is very resistant to deterioration caused by a thermal cycle in the presence of oxygen.

The invention claimed is:

1. An acid gas absorbent comprising:

a solvent; and at least one or more amine compounds selected from the group consisting of amine compounds represented by Formula (1a) and Formula (1b); and an additional amine compound:

(1a)

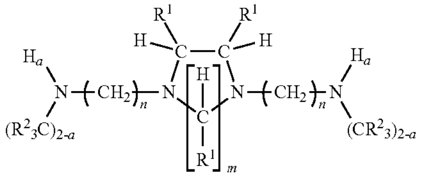

(1b)

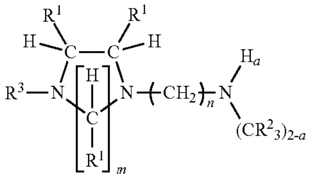

wherein:

$R^1$'s are each independently hydrogen or an unsubstituted or substituted alkyl group having 3 or less carbon atoms, $R^2$'s are each independently hydrogen or an unsubstituted or substituted alkyl group having 3 or less carbon atoms, and at least two of $R^2$'s contained in one-$CR_2^3$ are not hydrogen, $R^3$ is hydrogen, a's are each 1, m is a number of 1 to 3; and n's are each independently a number of 1 to 4, a content rate of the amine compound represented by Formula (1a) or (1b) is 10 to 60 mass % and a content rate of the additional amine compound is 1 to 50 mass %, based on the total amount of the acid gas absorbent, and the additional amine compound is selected from the group consisting of 1-(2-hydroxyethyl) piperazine,
N-isopropyldiethanolamine,
N-isopropyldipropanolamine,
N-isopropyldibutanolamine,
N-isopropyldipentanolamine,
N-isopropyldihexanolamine,
3-[(2-hydroxyethyl)(propan-2-yl)amino]propan~1-ol,
4-[(2-hydroxyethyl)(propan-2-yl)amino]butan-1-ol,
5-[(2-hydroxyethyl)(propan-2-yl)amino]pentan-1-ol,
6-[(2-hydroxyethyl)(propan-2-yl)amino]hexan-1-ol,
N-sec-butyldiethanolamine,
N-sec-butyldipropanolamine,
N-sec-butyldibutanolamine,
N-sec-butyldipentanolamine,
N-sec-butyldihexanolamine,
3-[(2-hydroxyethyl)(butan-2-yl)amino]propan-1-ol,
4-[(2-hydroxyethyl)(butan-2-yl)amino]butan-1-ol,
5-[(2-hydroxyethyl)(butan-2-yl)amino]pentan-1-ol,
6-[(2-hydroxyethyl)(butan-2-yl)amino]hexan-1-ol,
N-cyclopentyldiethanolamine,
N-cyclopentyldipropanolamine,
N-cyclopentyldibutanolamine,
N-cyclopentyldipentanolamine,
N-cyclopentyldihexanolamine,
3-[(2-hydroxyethyl)(cyclopentyl)amino]propan-1-ol,
4-[(2-hydroxyethyl)(cyclopentyl)amino]butan-1-ol,
5-[(2-hydroxyethyl)(cyclopentyl)amino]pentan-1-ol,
6-[(2-hydroxyethyl)(cyclopentyl)amino]hexan-1-ol,
2-azetidine methanol,
2-pyrrolidinemethanol,
2-piperidinemethanol,
3-piperidineethanol,
1-(2-hydroxyethyl) piperazine,
2-(hydroxymethyl) piperazine,
3-hydroxypyrrolidine,
3-pyrrolidinemethanol,
2-(2-hydroxyethyl) pyrrolidine,
4-piperidineethanol,
3-hydroxypiperidine,
4-hydroxypiperidine, and
4-(hydroxymethyl) piperidine.

2. The acid gas absorbent according to claim 1, wherein the n's are 2 or 3.

3. The acid gas absorbent according to claim 1, wherein the mis 2.

4. The acid gas absorbent according to claim 1, wherein the additional amine compound is selected form the group consisting of:

1-(2-hydroxyethyl) piperazine,
N-isopropyldiethanolamine,
N-isopropyldipropanolamine,
3-[(2-hydroxyethyl)(propan-2-yl)amino]propan-1-ol,
N-sec-butyldiethanolamine,
N-sec-butyldipropanolamine,
N-sec-butyldibutanolamine,
3-[(2-hydroxyethyl)(butane-2-yl)amino]propan-1-ol,
N-cyclopentyldiethanolamine,
N-cyclopentyldipropanolamine, and
3-[(2-hydroxyethyl)(cyclopentyl)amino]propan-1-ol.

5. The acid gas absorbent according to claim 1, wherein the additional amine compound is 1-(2-hydroxyethyl) piperazine.

6. The acid gas absorbent according to claim 1, comprising:

the solvent;

at least one or more amine compounds selected from the group consisting of amine compounds represented by Formula (1a); and the additional amine compound.

7. The acid gas absorbent according to claim 1, further comprising an additive selected from the group consisting of an antioxidant, a pH adjusting agent, an antifoaming agent, and an anticorrosive.

8. A method for removing an acid gas, comprising: bringing a gas containing an acid gas into contact with the acid gas absorbent according to claim 1 to remove the acid gas from the gas containing the acid gas.

9. An acid gas removal apparatus, comprising:

an absorber comprising the acid gas absorbent according to claim 1, that removes an acid gas from a gas containing the acid gas by causing the acid gas absorbent to absorb the acid gas by contact between the gas containing the acid gas and the acid gas absorbent; and a regenerator that desorbs the acid gas from the acid gas absorbent that has absorbed the acid gas to regenerate the acid gas absorbent, wherein the acid gas absorbent that has been regenerated by the regenerator is reused by the absorber.

* * * * *